United States Patent
Park et al.

(10) Patent No.: US 8,918,135 B2
(45) Date of Patent: Dec. 23, 2014

(54) METHOD AND APPARATUS FOR CONTROLLING UPLINK TRANSMISSION POWER

(75) Inventors: Sungho Park, Anyang-si (KR); Jiwon Kang, Anyang-si (KR); Sunam Kim, Anyang-si (KR); Binchul Ihm, Anyang-si (KR); Jinyoung Chun, Anyang-si (KR); Kitae Kim, Anyang-si (KR); Dongcheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 106 days.

(21) Appl. No.: 13/583,501

(22) PCT Filed: Mar. 8, 2011

(86) PCT No.: PCT/KR2011/001606
§ 371 (c)(1),
(2), (4) Date: Sep. 7, 2012

(87) PCT Pub. No.: WO2011/111988
PCT Pub. Date: Sep. 15, 2011

(65) Prior Publication Data
US 2012/0327804 A1    Dec. 27, 2012

Related U.S. Application Data

(60) Provisional application No. 61/315,014, filed on Mar. 18, 2010, provisional application No. 61/441,290, filed on Feb. 10, 2011, provisional application No. 61/381,445, filed on Sep. 10, 2010, provisional application No. 61/311,746, filed on Mar. 8, 2010, provisional application No. 61/405,214, filed on Oct. 21, 2010.

(30) Foreign Application Priority Data

Mar. 8, 2011    (KR) .................. 10-2011-0020580

(51) Int. Cl.
| | |
|---|---|
| H04B 7/00 | (2006.01) |
| G08C 17/00 | (2006.01) |
| H04W 4/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 52/14 | (2009.01) |

(52) U.S. Cl.
CPC .................... *H04W 52/146* (2013.01)
USPC ........... 455/522; 455/524; 370/311; 370/328; 370/329; 370/252

(58) Field of Classification Search
CPC ..... H04W 24/02; H04W 24/10; H04W 24/00; H04W 24/08; H04W 28/048; H04W 28/04; H04W 28/18; H04W 52/146; H04W 52/04; H04W 52/143; H04W 52/16; H04W 52/18; H04W 52/226; H04W 52/241; H04W 52/243; H04W 52/325; H04W 52/34; H04W 52/365; H04W 52/58; H04W 56/0005; H04W 56/0085; H04W 72/082; H04W 72/0413; H04W 72/042; H04W 72/04; H04W 72/0473; H04W 72/085; H04W 72/1231; H04W 72/1278; H04W 72/1289; H04W 74/004; H04W 88/06; H04B 7/024; H04B 7/0632; H04B 7/0452; H04B 2001/0416; H04J 11/0053
USPC ......... 370/329, 336, 328, 280, 252, 331, 216, 370/311, 315, 332; 455/522, 426.1, 425, 455/438, 452.1, 452.2, 501, 509, 524; 375/346
See application file for complete search history.

(56) References Cited

U.S. PATENT DOCUMENTS

| | | | |
|---|---|---|---|
| 6,266,528 B1 * | 7/2001 | Farzaneh ................. | 455/423 |
| 8,494,073 B2 * | 7/2013 | Wang et al. ............... | 375/267 |
| 8,515,481 B2 * | 8/2013 | Chen et al. ............... | 455/522 |
| 8,571,593 B2 * | 10/2013 | Lee et al. ................. | 455/522 |

○ : Antenna

| | | | | |
|---|---|---|---|---|
| 8,599,769 | B2 * | 12/2013 | Yang et al. | 370/329 |
| 2007/0115874 | A1 * | 5/2007 | Usuda et al. | 370/328 |
| 2007/0129094 | A1 * | 6/2007 | Jeong et al. | 455/522 |
| 2010/0113077 | A1 * | 5/2010 | Lee et al. | 455/501 |
| 2010/0208608 | A1 * | 8/2010 | Wang | 370/252 |
| 2011/0002279 | A1 * | 1/2011 | Yang et al. | 370/329 |
| 2011/0111766 | A1 * | 5/2011 | Yang et al. | 455/452.2 |
| 2011/0183702 | A1 * | 7/2011 | Weaver et al. | 455/522 |
| 2011/0207499 | A1 * | 8/2011 | Liu | 455/522 |

FOREIGN PATENT DOCUMENTS

| | | |
|---|---|---|
| KR | 10-2006-0033712 | 4/2006 |
| KR | 10-2009-0097805 | 9/2009 |
| KR | 10-2010-0006144 | 1/2010 |

OTHER PUBLICATIONS

Wang; Proposed text from DL PHY Ctrl Drafting group for IEEE 802.16m Amendment, IEEE 802.16 Broadband Wireless Access Working Group, Mar. 5, 2009.*

* cited by examiner

*Primary Examiner* — Benjamin H Elliott, IV
*Assistant Examiner* — Eric Nowlin

(74) *Attorney, Agent, or Firm* — Lee, Hong, Degerman, Kang & Waimey

(57) ABSTRACT

The present description relates to a method for controlling uplink power in a distributed multi-node system, comprising the following steps: receiving reference signals from a plurality of antenna nodes containing at least one antenna; estimating average propagation loss on the basis of the receiving power of the reference signals received from the plurality of antenna nodes; receiving, via a downlink control channel, noise and interference (NI) information from a base station which contains the plurality of antenna nodes; and determining uplink transmission power using the estimated average propagation loss and the received noise and interference information.

16 Claims, 7 Drawing Sheets

TRADITIONAL RAN ARCHITECTURE
(THREE SECTOR CELL SITES)

SMALL CELL RAN ARCHITECTURE WITH BTS HOTEL AND DAS
(EACH HEXAGON IS A CELL SITE)

TRADITIONAL RAN ARCHITECTURE
(THREE SECTOR CELL SITES)

SMALL CELL RAN ARCHITECTURE WITH BTS HOTEL AND DAS
(EACH HEXAGON IS A CELL SITE)

METHOD AND APPARATUS FOR CONTROLLING UPLINK TRANSMISSION POWER

CROSS-REFERENCE TO RELATED APPLICATIONS

This application is the National Stage filing under 35 U.S.C. 371 of International Application No. PCT/KR2011/001606, filed on Mar. 8, 2011, which claims the benefit of earlier filing date and right of priority to Korean Patent Application No. 10-2011-0020580, filed on Mar. 8, 2011, and also claims the benefit of U.S. Provisional Application Ser. No. 61/311,746, filed on Mar. 8, 2010, U.S. Provisional Application Ser. No. 61/315,014, filed on Mar. 18, 2010, U.S. Provisional Application Ser. No. 61/381,445, filed on Sep. 10, 2010, U.S. Provisional Application Ser. No. 61/405,214, filed on Oct. 21, 2010 and U.S. Provisional Application Ser. No. 61/441,290, filed on Feb. 10, 2011, the contents of which are all hereby incorporated by reference herein in their entirety.

TECHNICAL FIELD

The present document relates to a method for controlling uplink transmission power and, more particularly, to a method and apparatus for controlling uplink transmission power in a distributed multi-node system.

BACKGROUND ART

In a current wireless communication environment, data demand has been rapidly increased due to diversification of services and communication devices, an increase in the number of communication devices owned by individuals, and the like. In order to satisfy high data transmission and processing demand, carrier aggregation, cognitive radio technique, or the like, of effectively using various distributed frequency bands, a MIMO technique of increasing data throughput in a particular frequency band, a multi-base station cooperative transmission technique, a multi-network cooperative transmission technique, and the like, have been developed.

In general, communication standards, which are currently considered or proposed, are configured to fit a cellular structure having a form of a centralized antenna system (CAS) in which respective antenna elements are installed in groups in the same area.

In a general base station, respective antenna elements (physical antenna elements/antenna ports) are installed in groups in the same area (intervals between antenna elements are within a few wavelengths). This is called a centralized antenna system (CAS).

In comparison, when respective antenna elements are located in different areas and connected by a wired link, it is called a distributed antenna system (DAS) or a distributed multi-node system (DMNS). Here, a group of antenna elements located in the same area is called an antenna node. Namely, a CAS may be considered as a system having one antenna node, and a DMNS may be considered as a system having one or more antenna nodes.

The antenna mentioned herein may generally refer to an 'antenna port (element) group' or a 'distributed antenna (DA) unit', but it may also be substituted by an 'antenna port', a 'pilot', or a 'reference signal (RS)'.

In a CAS, when a plurality of antenna elements exist in a single antenna node, channel ranks with respect to respective antenna elements may be changeable due to a change in small-scale channel quality. This means that the number of transmission streams (spatial streams/virtual antennas/layers) may be changed.

However, in a DMNS, one or more antenna nodes may be located to have different areal characteristics, so when the antenna nodes perform joint processing, the number of ranks may be increased due to different large scale channel quality. In this case, channel ranks of the respective antenna nodes may be changed due to the change in the small scale channel quality. Namely, in the DMNS, both large scale channel quality and small scale channel quality may affect rank adaptation.

FIG. 1 illustrates architecture of a downlink MIMO transmission end in a wireless access system.

The structure of the downlink MIMO transmission end will be described in detail with reference to FIG. 1 as follows. The transmission end includes an encoder 110, a precoder 120, subcarrier mappers 130-1, ..., 130-K, an OFDM (Orthogonal Frequency Division Multiplexing) signal generator, Nt number of transmission antennas 500-1, ..., 500-Nt.

The encoder 110 encodes a data stream desired to be transmitted according to a predetermined coding scheme to form coded data, modulates the coded data, and disposes the same as symbols expressing positions in signal constellation. There is no limitation in a modulation scheme, and m-PSK (m-Phase Shift Keying), m-QAM (m-Quadrature Amplitude Modulation), or the like may be used to modulate the coded data. In order to modulate the coded data, the encoder 110 may include a modulator as an independent module. Meanwhile, the encoder 110 may define an input symbol layer in order to distribute particular antenna symbols to a path of a pertinent antenna.

A layer refers to an information path of information input to the precoder 120, and an information path before the precoder 120 may be called a virtual antenna or layer. In order to define a symbol layer, the encoder 110 may include a layer mapper as an independent module.

The precoder 120 may process an input symbol according to a MIMO scheme according to the multiple transmission antennas 500-1, ..., 500-Nt to output particular antenna symbols, and distributes the particular antenna symbols to pertinent subcarrier mappers 130-1, ..., 130-K. Mapping of MIMO streams to antennas is performed by the precoder 120, and here, an output x of the encoder 110 is multiplied by Nt×Mt precoder w and an output from the precoder may be represented as Nt×MF matrix z.

$$x = Wx = \begin{bmatrix} z_{1,1} & z_{1,2} & - & z_{1,N_F} \\ z_{2,1} & z_{1,2} & - & z_{2,N_F} \\ - & - & - & - \\ z_{N_t,1} & z_{N_t,2} & - & z_{N_t,N_F} \end{bmatrix} \qquad \text{[Equation 1]}$$

Here, Nt indicates the number of transmission antennas, and $z_{j,k}$ indicates an output symbol to be transmitted through jth physical antenna on kth subcarrier. The precoder matrix w may be set as a matrix informed by a base station to a terminal within a predefined codebook, may be selectively determined according to a resource index in the predefined codebook, or may be set by estimating a downlink reference signal and subsequently selecting or calculating an appropriate precoder. Also, instead of defining a precoder matrix between a base station and a terminal, a terminal may randomly set a precoder matrix such that an output from the precoder is a virtual 1Tx antenna.

The subcarrier mappers 130-1, . . . , 130-K allocate the particular antenna symbols to appropriate subcarriers and multiple the same according to users. The OFDM signal generator modulates the particular antenna symbols according to OFDM and outputs OFDM symbols. The OFDM signal generator may perform IFFT (Inverse Fast Fourier Transform) on the particular antenna symbols, and a CP (Cyclic Prefix) may be inserted into a time domain symbol which has undergone the IFFT.

The OFDM symbols are transmitted through respective transmission antennas.

For reference, the transmission end may operate in two types of modes, namely, a single codeword (SCW) mode and a multi-codeword (MCW). In the SCW mode, a single codeword is transmitted through a plurality of layers created by the MIMO system regardless of the number of layers, and in the MCW mode, a single codeword is transmitted through each of a plurality of layers created by the MIMO system.

In the MCW mode, a receiver may be able to determine whether or not each codeword has been successfully decoded through a CRC (Cyclic Redundancy Check) applied to each codeword, so the reception side can obtain an additional through a reception process such as interference cancelation.

Thus, besides modules for performing demodulation, channel decoding, and multiplexing, the receiver operating in the MCW mode may further include an interference canceller for canceling interference.

In FIG. 1, in the CAS, the number of MIMO streams is determined by small-scale channel quality, and in the DMNS, the number of MIMO streams is determined by both small-scale channel quality and large-scale channel quality. The MIMO streams are mapped to actual antennas through the precoder. Namely, the number of antennas may be different from the number of transmission streams.

In the CAS having a single DA, a difference in large-scale channel quality between pertinent antenna elements is so small enough to be negligible. Thus, in the CAS, an areal channel geometry (or areal channel characteristics) or large-scale channel quality between respective antenna elements and a terminal is similar, so there is not much difference in uplink power of received by the respective reception antenna element.

Meanwhile, in the case of the DMNS, there may be wide distance variations between respective DAs and a terminal, so an areal channel geometry between the respective DAs and the terminal may be different. Such areal characteristics between the DAs and the terminal mean that the number of antenna elements of the base station is fixed with respect to the base station in the case of the existing CAS, but may vary in the case of the DMNS.

Namely, in the DMNS, the number of transmission antennas and reception antennas of the base station viewed from the terminal may be variable according to a location of the terminal and a channel state, and here, actually used antennas are called effective (physical) antenna elements.

As described above, the CAS and the DMNS have different antenna configurations and different channel characteristics due to the different antenna configurations, and thus, an existing power control algorithm and mechanism designed for the general CAS lack ability to guarantee performance in the DMNS.

DISCLOSURE

Technical Problem

An aspect of the present invention provides a method for determining uplink transmission power in consideration of areal channel characteristics (or areal channel geometry) between respective distributed antenna nodes (DA) and a terminal by defining a power control algorithm required for performing uplink power control and a relevant mechanism in a distributed antenna system (DAS) or a distributed multi-node system (DMNS).

DISCLOSURE

Technical Solution

According to an aspect of the present invention, there is provided a method for controlling uplink power in a distributed multi-node system (DMNS), including: receiving reference signals from a plurality of antenna nodes including at least one antenna; estimating an average propagation loss based no reception power of the reference signals received from the plurality of antenna nodes; receiving nose and interference (NI) information from a base station (BS) including the plurality of antenna nodes via a downlink control channel; and determining uplink transmission power by using the estimated average propagation loss and the received NI information.

The method may further include: selecting certain antenna nodes from among the plurality of antenna nodes, wherein the selecting includes: receiving an effective reception power threshold value with respect to the reception power of the reference signals from the BS; and comparing the effective reception power threshold value with the reception power of the received reference signals, wherein the certain antenna nodes are selected according to the comparison result.

In the estimating of the average propagation loss, the average propagation loss may be estimated by using an arithmetic mean with respect to reception power of the reference signals corresponding to the plurality of respective antenna nodes, an arithmetic mean with respect to reception power greater than the effective reception power threshold value among reception power of the reference signals corresponding to the plurality of respective antenna nodes, or weighted average power with respect to the certain antenna nodes.

The NI information may be a power level of NI corresponding to each of the plurality of antenna nodes or a difference value between power levels of NI with respect to antenna nodes different from the one antenna node.

Uplink transmission power may be determined by using the arithmetic mean of NI information, the arithmetic mean of the power levels of NI greater than a threshold value included in the NI information, or a weighted NI power average with respect to a certain antenna node.

The weighted power average may be calculated after a differential weight is applied to each of the plurality of antenna nodes with reference to reception power of corresponding reference signals.

After a reference antenna node among the plurality of antenna nodes is determined, the weight may be determined by using a difference between uplink reception power of the respective antenna nodes with respect to the reference antenna node or a ratio of uplink reception power of the respective antenna nodes to the reference antenna node.

The weight may be previously determined for each antenna node or calculated according to a weight generation rule.

The method may further include: receiving antenna control information indicating all the antenna nodes included in the BS or indexes or indicating the number of antenna nodes to be measured by a terminal, from the BS; determining target antenna nodes whose average propagation loss is to be estimated, based on the received antenna control information; and transmitting information regarding the determined target antenna nodes to the BS.

The method may further include: receiving a target SINR indicating a minimum value of SINR requested by the BS from the BS, wherein the target SINR is determined through any one of a median value, an average value, the highest value and the lowest value among the ratios of noise to strength of downlink signals received from the plurality of antenna nodes.

The method may further include: transmitting downlink reception power information measured from the plurality of antenna nodes to the BS; and receiving information regarding a difference between the transmitted downlink reception power and uplink reception power from the BS.

The difference information may be received together with the NI information or offset information indicating a power control adjustment value from the BS.

The reference signals are received by antenna nodes or by antennas.

According to another aspect of the present invention, there is provided a terminal for controlling uplink power in a distributed multi-node system (DMNS), including: a memory; a radio frequency (RF) unit configured to transmit and receive a radio signal to and from the outside; and a controller configured to control the RF unit to receive reference signals from a plurality of antenna nodes including at least one antenna and receive noise and interference (NI) information from a base station (BS) including the plurality of antenna nodes via a downlink control channel, and to provide control to estimate an average propagation loss based on reception power of the reference signals received from the plurality of antenna nodes and determine uplink transmission power by using the estimated average propagation loss and the received NI information.

The controller may select certain antenna nodes from among the plurality of antenna nodes, control the RF unit to receive an effective reception power threshold value with respect to reception power of the reference signals from the BS, and compare the effective reception power threshold value with reception power of the received reference signals to select the certain antenna nodes according to the comparison result.

The controller may provide control to estimate the average propagation loss by using an arithmetic mean with respect to reception power of the reference signals corresponding to the plurality of respective antenna nodes, an arithmetic mean with respect to reception power greater than the effective reception power threshold value among reception power of the reference signals corresponding to the plurality of respective antenna nodes, or weighted average power with respect to the certain antenna nodes.

The weighted power average may be calculated after a differential weight is applied to each of the plurality of antenna nodes with reference to reception power of corresponding reference signals.

After a reference antenna node among the plurality of antenna nodes is determined, the weight may be determined by using a difference between uplink reception power of the respective antenna nodes with respect to the reference antenna node or a ratio of uplink reception power of the respective antenna nodes to the reference antenna node.

The controller may control the RF unit to receive antenna control information indicating all the antenna nodes included in the BS or indicating the number of antenna nodes to be measured by a terminal, from the BS, and control the RF unit to determine target antenna nodes whose average propagation loss is to be estimated, based on the received antenna control information and transmit information regarding the determined target antenna nodes to the BS.

The controller may control the RF unit to receive a target SINR indicating a minimum value of an SINR requested by the BS, wherein the target SINR is determined through any one of a median value, an average value, the highest value and the lowest value among the ratios of noise to strength of downlink signals received from the plurality of antenna nodes.

The controller may control the wireless communication unit to transmit information regarding downlink reception power measured from the plurality of antenna nodes to the BS, and control the RF unit to receive information regarding a difference between the transmitted downlink reception power and uplink reception power from the BS.

The difference information may be received together with the NI information or offset information indicating a power control adjustment value from the BS.

According to another aspect of the present invention, there is provided a method for controlling transmission power with respect to an initial ranging channel in a distributed multi-node system (DMNS), including: receiving reference signals from a plurality of antenna nodes including at least one antenna; measuring received signal strength (RSS) of the reference signals received from the plurality of antennas; receiving EIRP information from a base station including the plurality of antenna nodes; and determining transmission power with respect to an initial ranging channel by using the received EIRP information and the measured RSS of the reference signals.

The EIRP information may include an EIRP value corresponding to each of all the antenna nodes included in the BS.

Initial ranging transmission power may be determined by using any one of an average EIRP value, a median EIRP value, a weighted average EIRP value, a maximum EIRP value, and a minimum EIRP value included in the received EIRP information.

The EIRP information may be transmitted through a broadcast message.

The EIRP information may be included in a superframe header (SFH) and transmitted.

The EIRP information may include an EIRP value with respect to a reference antenna node among the plurality of antenna nodes and an EIRP difference value between the reference antenna node and the other remaining antenna nodes.

Transmission power with respect to the initial ranging channel may be determined by using any one of a average value, a median value, and a weighted average value with respect to reception signal strength of the received reference signals or by using a maximum value or a minimum value among the reception signal strength of the received reference signals.

Advantageous Effects

According to embodiments of the present invention, in the DMNS, information regarding antenna nodes (DA) included in a BS or antenna nodes to be measured by a terminal is transmitted to the terminal, whereby accurate uplink transmission power can be determined and calculation complexity of the terminal in calculating uplink transmission power can be reduced.

Also, according to embodiments of the present invention, by estimating accurate downlink channel characteristics between respective antenna nodes and a terminal and noise and interference received from the respective antenna nodes, accurate uplink transmission power of the terminal can be determined.

Also, according to embodiments of the present invention, when uplink transmission power of a terminal is determined, a difference between downlink reception power and uplink reception power is reflected, thus determining accurate uplink transmission power of the terminal.

MODE FOR INVENTION

Figure 1:
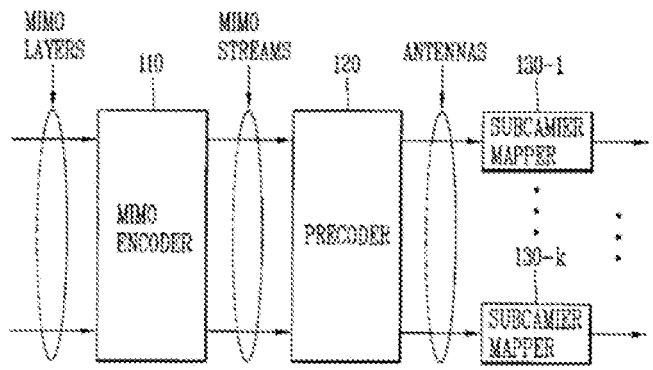
FIG. 1 is a view illustrating architecture of a downlink MIMO sending end in a wireless access system.

Embodiments of the present invention will be described in detail with reference to the accompanying drawings. In the below description, it should be appreciated that only parts required for understanding operations of the present disclosure are described and a description of the other parts is omitted in order not to divert the gist of the present disclosure.

Embodiments hereinafter are combinations of components and features of the present disclosure. Respective components or features may be optional unless otherwise specified. Respective components or features may be implemented without being combined with other components or features. Also, some of components and/or features may be combined to configure an embodiment of the present disclosure. Sequence of operations described in the embodiments of the present disclosure may be changed. Some components or features of one embodiment may be included in another embodiment or may be replaced with components or features corresponding to another embodiment.

Embodiments of the present disclosure are described based on a data transmission and reception relationship between a base station (BS) and a terminal. Here, a BS has a meaning as a terminal node of a network, which directly communicates with a terminal. In this document, a particular operation described to be performed by a BS may be performed by an upper node of the BS according to circumstances.

Namely, it is obvious that various operations performed to communicate with a terminal in a network comprised of network nodes including a BS may be performed by a BS or network nodes other than a BS. BS may be replaced by terms such as fixed station, Node B, eNode B (eNB), access point, and the like. Also, terminal may be replaced by terms such as user equipment (UE), mobile station (MS), mobile subscriber station (MSS), and the like.

Embodiments of the present disclosure may be implemented through various means. For example, embodiments of the present disclosure may be implemented by hardware, firmware, software, or any combination thereof.

For hardware implementation, methods according to embodiments of the present disclosure described herein may be implemented by one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

For firmware or software implementation, the methods according to embodiments of the present disclosure may be implemented in the form of a module, a procedure, a function, or the like, performing the foregoing functions or operations. Software codes may be stored in a memory unit and driven by a processor. The memory unit may be positioned within or outside of the processor and exchange data with the processor through various known means.

Particular terms used in the following description are provided to help understand the present disclosure, and the use of such particular terms may be changed into different forms within the scope of the technical concept of the present disclosure.

Hereinafter, outline of a distributed multi-node system (DMNS) will be briefly described.

Distributed Multi-Node System (DMNS)

Unlike a centralized antenna system (CAS) in which BS (BTS, Node-B, eNode-B, etc.) antennas are crowded at the center of a cell, a DMNS or a distributed antenna system (DAS) refers to a system in which a single BS manages antenna nodes spread to various locations within a cell.

A DMNS and a DAS mentioned in the present disclosure have the same meaning and may be mixedly used.

Also, an antenna node, which refers to an antenna (port) group or a DA as mentioned above, and 'antenna node', 'antenna port group', 'DA' may be mixed used in the present disclosure.

A DMNS is differentiated from a femto/pico cell in that several antenna nodes constitute a single cell. At an initial stage, a purpose of the DMNS was to perform repetition by installing more antenna nodes to cover a shadow area. However, in a broad sense, a DMNS may be considered a type of multi-input multi-output (MIMO) system in that BS antennas can support one or more users by simultaneously sending or receiving several data streams, and a MIMO system is recognized as an essential system for satisfying requirements of next-generation communication owing to high spectral efficiency thereof.

From a point of view of a MIMO system, a DMNS has advantages in that high power efficiency is obtained as a distance between a user and an antenna is reduced to be shorter than that of a CAS, a high channel capacity is obtained because of low correlation and interference between BS antennas, communication performance having relatively uniform quality can be secured irrespective of a location of a user in a cell.

Figure 2:
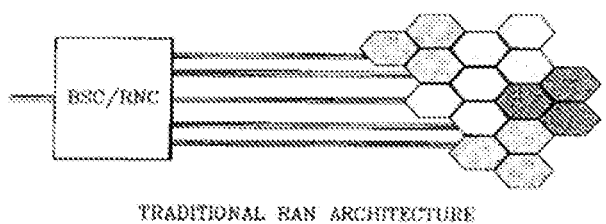
FIG. 2 is a view illustrating an example of a distributed multi-node system (DMNS).
Figure 2:
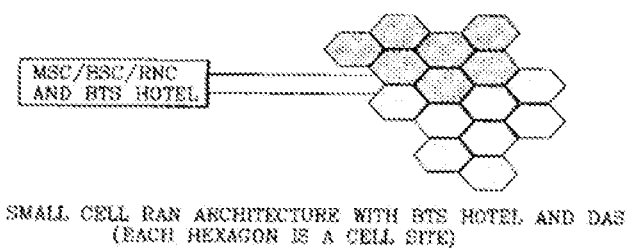

FIG. 2 is a view illustrating an example of a DMNS structure.

Referring to FIG. 2, a DMNS is comprised of a BS and antenna nodes (groups, clusters, DAs, etc.). The antenna nodes may be connected to the BS through a fixed line or wirelessly and may include one or more antennas. In general, antennas included in one antenna node have characteristics that the shortest distance between antennas is within a few meters and the antennas belong to the same spot areally, and an antenna node serves as an access point a terminal may access.

Figure 3:
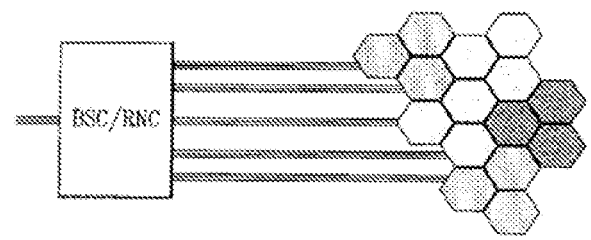
FIG. 3(a) is a view illustrating a structure of a cellular system.
FIG. 3(b) is a view illustrating a BTS hotel structure of the DMNS.
Figure 3:
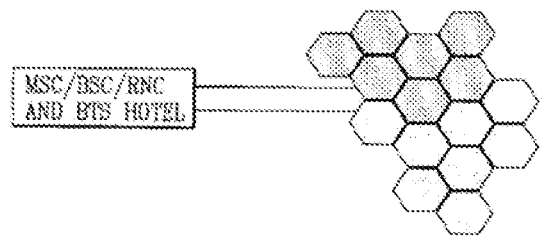

FIG. 3(a) is a view illustrating a structure of a cellular system, and FIG. 3(b) is a view illustrating a BTS hotel structure of the DMNS.

Referring to FIG. 3(a), in an existing cellular system, a single BS (or BTS) administers three sectors, and each BTS is connected to a BSC/RNC through a backbone network. However, as illustrated in FIG. 3(b), in the DMNS, BTSs connected to respective antenna nodes may gather to one place (BTS hotel). Thus, costs for land and a building for installation of BTSs can be reduced and BTSs can be easily maintained and managed in one area, and in addition, since BTSs and MSC/BSC/RNC are all installed in one area, a backhaul capacity can be drastically increased.

Due to the extension in implementation in the form of the BTS hotel, cooperative communication between or among multiple nodes (here, APs) is facilitated. For a smooth cooperation between or among multiple nodes, some nodes may be grouped to cooperatively operate as a sine cell (assigned a single cell ID) (intra-cell cooperation), and an inter-cell cooperation may be applied to the grouped nodes. In the present disclosure, the intra-cell cooperation will be largely discussed, but the present invention may also be applicable to the inter-cell cooperation.

Thus, these generally refer to as a multi-node cooperation technique. Namely, a multi-node system generally refers to a DMNS operating as a single cell and a multi-cell system.

Figure 4:
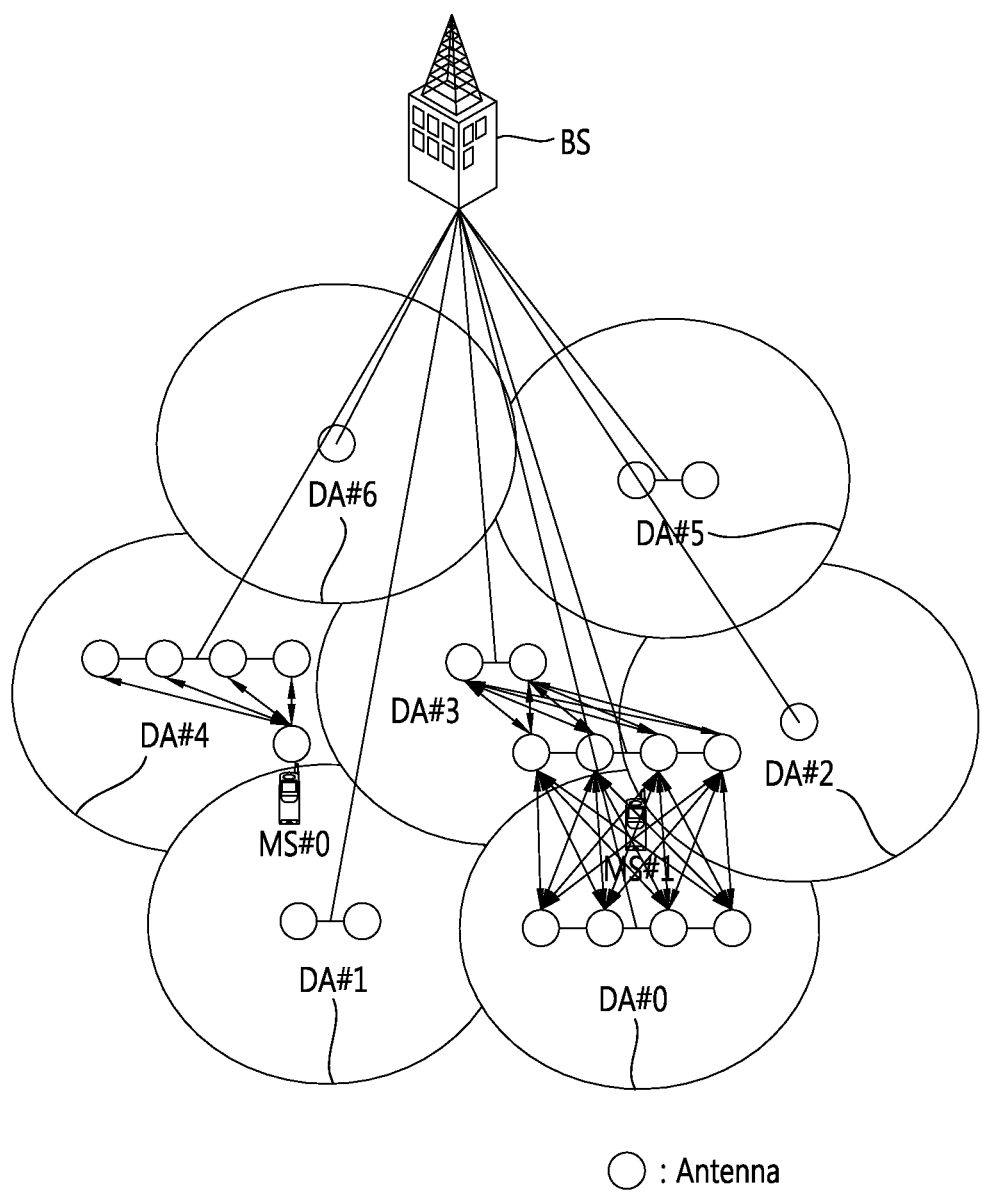
FIG. 4 is a view illustrating a basic scenario with respect to a single DMNS.

FIG. 4 is a view illustrating a basic scenario with respect to a single DMNS.

Referring to FIG. 4, a transmission/reception antenna of a DMNS cell is comprised of a total of seven DAs and a total of 16 antennas, i.e., two DAs (DA#2, DA#6) each retaining a single antenna, three DAs (DA#1, DA#3, DA#5) each retaining two antennas, two DAs (DA#0, DA#4) each retaining four antennas, and the like.

It is assumed that there are a total of three mobile stations, i.e., MS#0 retaining a single antenna, MS#2 retaining two antennas, and MS#1 retaining four antennas. Here, the number of effective antennas of a BS detected by each mobile station varies according to local channel characteristics of mobile stations. Namely, MS#0 detects four antennas, MS#1 detects six antennas, and MS#2 detects two antennas.

Hereinafter, a method for obtaining a power level required for an uplink transport channel will be described briefly.

Uplink Power Control

In order to transmit an uplink control signal and uplink data, power levels required for an uplink control channel and an uplink data channel are required to be allocated.

Uplink power control is supported for initial calibration and to periodically adjust transmission power without a data loss. An uplink power control algorithm determines transmission power of each subcarrier of each symbol in order to compensate for a path loss, shadowing, and fast fading. Also, in uplink power control, a cell interference level should be controlled.

A power control method may be divided into an open loop power control (OLPC) and a closed loop power control (CLPC). The CLPC is a method of raising or lowering transmission power of a mobile station by a direct power increase/decrease message transmitted from a BS. The OLPC is a method of determining transmission power directly by a mobile station (MS) based on several parameters transmitted from a BS, rather than receiving a direct increase/decrease command from the BS. For example, when a BS transmits power control information to an MS, the MS performs uplink power control based on the power control information received from the BS.

1. Uplink power control in IEEE 802.16 system

A mobile station may determine transmission power of each stream of each subcarrier of an uplink transport channel by using Equation 2 shown below.

$$P(\text{dBm}) = L + \text{SINR}_{Target} + NI + \text{Offset} \qquad \text{[Equation 2]}$$

In Equation 2, L is an estimated average downlink propagation loss calculated by the mobile station at a corresponding timing, which includes a transmission antenna gain and a path loss of the corresponding mobile station. The mobile station may calculate the propagation loss L based on the entire power actually received through subcarriers of a preamble of a frame. Or, the value L may also be obtained through a DL reference signal. Namely, there may be various implementation methods.

$\text{SINR}_{Target}$ is a target SINR value with respect to resource (resource/channel) desired to be transmitted. $\text{SINR}_{Target}$ is calculated by using a size of allocated resource, a minimum SINR condition, an IoT (Interference plus noise over Thermal noise) level, a signal-to-interference power ratio (SIR), and the like. Compensation for a current MCS (or CQI) may be applied to the value according to circumstances.

NI is a power amount of an average noise and interference estimated by the BS, which is transferred to the MS through a downlink (DL) control channel.

Offset is a power control adjustment value estimated by the BS or a power control adjustment value estimated by the MS. Also, Offset may include the both values according to circumstances.

The respective components of Equation 2 appear as arithmetic average values with respect to pertinent antennas.

(This is possible because respective antenna elements are installed in an congregated form, so channel characteristics between or among the respective antenna elements are not greatly different or negligible in case of a CAS).

In order to control power with respect to a data channel, reference $\text{SINR}(\text{SINR}_{Target})$ is determined as expressed by Equation 3 shown below.

$$\text{SINR}_{Target} = \qquad \text{[Equation 3]}$$
$$10\log 10\left(\max\left(10^{\wedge}\frac{\text{SINR}_{MIN}(\text{dB})}{10}\right), \gamma_{IoT} \times \text{SIR}_{DL} - \alpha\right) - $$
$$\beta \times 10\log 10(TNS)$$

In Equation 3, $\text{SINR}_{MIN}$ is a minimum SINR anticipated by the BS. Namely, $\text{SINR}_{MIN}$ is a minimum SINR to improve performance of a mobile station located in a cell boundary. $\gamma_{IoT}$ is a fairness and IoT control factor.

$\text{SIR}_{DL}$ is a linear ratio of a downlink signal to interference power measured by the pertinent mobile station. β is a factor according to the number of reception antennas of the BS. Namely, β is a stream factor signaled from MAC (Media Access Control) power control signaling and indicates whether to apply TNS (Total Number of Streams), which may be determined by and transmitted from the BS. TNS indicates the total number of streams in an LRU (Logical Resource Unit) indicated in uplink MAP information and may be unicast to the pertinent mobile station by the BS.

2. Uplink Power Control in LTE-A System

Hereinafter, as an example of a power control technique in a 3GPP LTE-A, an equation for calculating transmission power of a PUSCH (Physical Uplink Shared Channel) as an uplink data channel will be described briefly. Equation 4 is a equation for obtaining uplink power with respect to a PUSCH.

$$P_{PUSCH}(i) = \min \{P_{CMAX}, 10\log_{10}(M_{PUSCH}(i)) + P_{O\_PUSCH}(j) + \alpha(j) \cdot PL + \Delta_{TF}(i) + f(i)\}$$ [Equation 4]

In Equation 4, i is a time index, $M_{PUSCH}(i)$ is maximum allowable power, and here, maximum allowable power follows types (or classes) of mobile stations. Also, $M_{PUSCH}(i)$ is determined according to an allocated resource block, has a value from 1 to 110, and is updated in every subframe. PL is an equation for compensating for a path loss, in which PL is a downlink path loss measured by the mobile station and α is a scaling value equal to or smaller than 1 and is expressed by a value of 3 bits.

If α is 1, it means that a path loss has been completely compensated for, and if α is smaller than 1, it means that a path loss has been partially compensated for.

Meanwhile, $P_{O\_PUSCH}(i)$ may be calculated as shown in Equation 5 below.

$$P_{O\_PUSCH} = P_{O\_CELL\_SPECIFICE} + P_{O\_UE\_SPECIFICE}$$ [Equation 5]

In Equation 4, f(i) is an MS-specific parameter controlled by the BS.

Hereinafter, a power control algorithm required for performing uplink power control in a DAS or DMNS proposed in the present disclosure and a mechanism thereof will be described in detail through respective embodiments.

First Embodiment

In general, when a mobile station (MS) is connected to a BS via a network, the MS may receive BS antenna information from the BS or obtain BS antenna information through detection of downlink control information.

Next, the MS measures RSRP, RSSI, and the like, thereof with respect to the BS by using a reference signal with respect to each cell such as a preamble of a downlink frame or MIMO mid-amble, a CRS (Cell-specific Reference Signal), CSI-RS (Channel State Information Reference Signal), and the like, and estimates a propagation loss (path loss).

The MS may calculate uplink transmission power with respect to target SINR, Target IoT, and the like, by using information regarding a noise and interference level (NI) along with the afore-mentioned information.

In a DMNS, respective antenna nodes are installed in a distributed manner, so link characteristics between the respective antenna nodes and the MS may be much different. Thus, if a downlink channel is estimated and uplink transmission power is obtained according to the related art method, there is a high possibility that unbalance of reception SINR is aggravated in each reception antenna node or an NI adjustment with respect to different cells or different antenna nodes fails.

Thus, in order to optimize uplink transmission performance in the DMNS, a first embodiment of the present disclosure proposes a method for effectively performing channel estimation with respect to nodes occupied by a mobile station and calculating uplink transmission power based thereon.

Transmission of antenna-related information to effectively measure downlink channel A multi-node system such as a DMNS has multiple antenna nodes. Thus, downlink channels from respective antenna nodes should be measured in order to calculate uplink transmission power based thereon. To this end, the BS transfers antenna-related information by using at least one of the following methods.

1) The BS transmits index information of all the antenna nodes included therein to the mobile station.

2) The BS transmits the number of all the antenna nodes included therein to the mobile station.

3) The BS transmits information regarding a combination (antenna number or/and antenna index) of all the antenna nodes included therein.

4) The BS transmits antenna index information of antenna nodes to be measured by the mobile station to the mobile station.

5) The BS transmits information regarding a combination (antenna number or/and antenna index) of antenna nodes to be measured by the mobile station to the mobile station.

6) The BS transmits an index of an antenna node to be measured by the mobile station to the mobile station.

7) The BS transmits the number of antenna nodes to be measured by the mobile station to the mobile station.

8) The BS transmits one antenna node index and threshold value to the mobile station.

In the case of 8), the mobile station determines an antenna node having a difference in link quality (e.g., a path loss) smaller than a threshold value as a measurement target through a comparison with the one antenna node informed by the BS.

In the case of 1)~8), the BS transmits information regarding an antenna topology (e.g., ULA, UCA, cross polarized antenna . . . ) with respect to each node to the mobile station.

Here, the BS may compare all the antenna node combinations with a predefined threshold value or a threshold value known through a higher message to determine an antenna node combination to be measured by the mobile station.

Or, the BS may determine a) a maximum number of antenna nodes or b) an antenna node combination comprised of antenna nodes included in a).

Determining Effective Antenna Node and Calculating Effective Path Loss

A mobile station calculates a path loss of each of target antenna nodes received from a BS, and re-calculates a representative path loss, namely, an effective path loss, by using the calculated path loss.

Here, the target antenna node for calculating the effective path loss may be determined by using at least one of the following methods.

1) Calculate an effective path loss over the entirety of the measured antenna nodes 2) Calculate an effective path loss over N number of antenna nodes having a low path loss (high link quality, high RSRP) among the measured antenna nodes.

In the case of 2), N may be a value received from the BS or a value randomly determined by the mobile station.

Here, in order to obtain the effective path loss, a weight may be applied to the pass loss calculation value of each antenna node. In this case, the weight may be a value received from the base station or a value determined by the mobile station.

Thereafter, an effective path loss with respect to the determined antenna nodes is determined by using at least one of the following methods.

Namely, an effective path loss may be determined by using 1) a average value, 2) a median value, 3) weighted averaging, 4) the weighted sum, 5) a minimum value, 6) or a maximum value, with respect to a path loss from the respective antenna nodes.

Also, the mobile station feeds back information regarding antenna nodes applied to calculate the effective path loss, to the BS.

Excluding a case in which the mobile station calculates an effective path loss by using all of the antenna nodes determined by the BS, the BS may not accurately know antenna nodes used by the mobile station to calculate the effective path loss.

In this case, the BS cannot estimate an accurate NI value with respect to antenna nodes occupied by the corresponding mobile station. Thus, the mobile station feeds back information regarding antenna nodes applied to calculate an effective path loss, namely, information regarding an effective antenna node, to the BS, so that the BS can estimate an accurate NI level and inform the mobile station about it to allow the mobile station to determine accurate uplink transmission power.

Or, with respect to a noise and interference level, the BS may calculate antenna nodes allocated to the mobile station and transmits the same such that it is UE-specific.

Unlike the existing single node system, in the multi-node system, the mobile station may not be allocated all the antenna nodes within a cell. In this case, if an NI measured with respect to all the nodes within a cell is used, accurate uplink power cannot be calculated due to a noise and interference level (NI level) error with respect to the mobile station, and as a result, interference between cells of respective antenna node groups or between nodes within the cell cannot be adjusted.

Thus, in the multi-node system, the BS calculates a noise and interference level with respect to the nodes actually allocated to the mobile station, and informs each mobile station (or terminal) about the calculated noise and interference level.

Second Embodiment

A second embodiment of the present disclosure provides a method for calculating uplink transmission power by measuring channel characteristics between respective DAs and a mobile station and determining the number of effective antenna nodes based on the measured channel characteristics in a distributed multi-node system (DMNS).

Also, the second embodiment of the present disclosure provides a method for calculating uplink transmission power by estimating power of a reference signal received from each DA or each antenna and noise and interference in the DMNS.

First, a method for determining an effective antenna and DA will be described.

Determining Effective Antenna and DA

When it is assumed that a mobile station can discriminate reception power in every antenna level, the mobile station may select an effective antenna by comparing reception power received from each antenna with an effective received power threshold (or an effective reception power level).

In this case, 1) the mobile station may select antennas exceeding the effective reception power level among respective antennas, or 2) the mobile station may measure average reception power of antennas of each DA and select DAs exceeding effective reception power level.

Also, when it is assumed that the mobile station can discriminate reception power in every DA level, the mobile station selects an effective DA by comparing reception power received from each DA with the effective reception power level.

Here, the effective reception power level (or effective received power threshold) is information provided to the mobile station by the BS.

Here, when an effective antenna is determined, the mobile station may omit the process of selecting an effective DA by comparing reception power received from each antenna with the effective reception power level. However, when the effective antenna or DA is to be changed due to a movement of the mobile station, or the like, the mobile station performs the process of selecting an effective antenna or DA through a comparison with the effective reception power level. Namely, when the mobile station determines an effective antenna or DA, it selects an effective antenna or DA through a comparison with effective reception power at an initial transmission or when an effective antenna or DA is changed.

Figure 5:
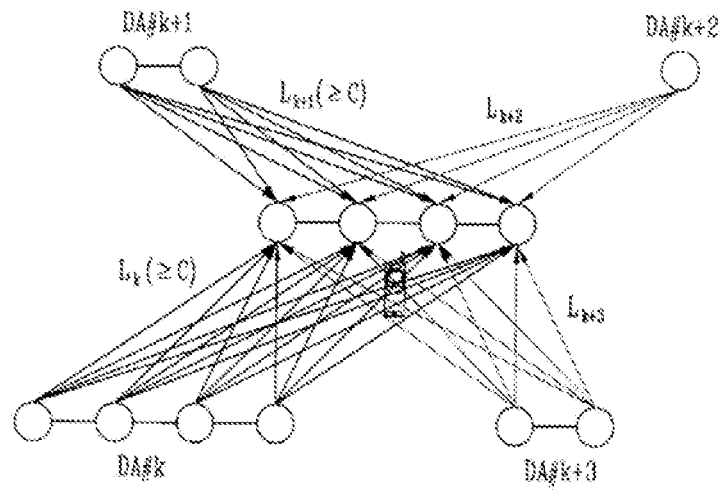
FIG. 5 is a view illustrating a process of measuring, by a terminal, downlink channel quality between distributed antenna nodes (DA) and the terminal by using a downlink reference signal and determining a number of effective antennas based on the measured downlink channel quality according to a second embodiment of the present invention.

FIG. 5 is a view illustrating a process of measuring, by a mobile station, downlink channel quality between a DA and a mobile station by using a downlink reference signal and determining the number of effective antennas based on the measured downlink channel quality.

Referring to FIG. 5, a mobile station having four reception antennas is located in a DAS cell having DAs having one to four transmission antennas. The corresponding mobile station compares reception power measured from the four DAs with the effective reception power level (C) and selects effective DAs DA#k and DA#k+1.

Thereafter, the mobile station provides information regarding the DAs to a BS.

Transmission Power Control in DMNS

When it is assumed that M number of effective DAs including P number of effective antennas among a total of N number of antennas are selected, uplink power control may be performed based on reception power thereof.

Uplink power control is generally used to perform initial power correction (initial calibration) and periodically correct transmission power to prevent a generation of a data loss. To this end, transmission power is determined by compensating for a path loss, shadowing, channel selective characteristics (fast fading or selective fading), and the like.

Among them, a path loss, inter-cell interference, noise, and the like, are large-scale channel quality which is relatively slowly hanged, and significantly affect channel characteristics between a pertinent DA or antenna and a mobile station. In comparison, channel selective characteristics are small-scale channel quality which reflects instantaneous channel characteristics between the pertinent DA or antenna and the mobile station.

Here, in the case of the DMNS, since the locations of respective DAs are dispersed, channel characteristics between respective DAs may be too large to be negligible although a difference in channel characteristics between antenna elements in the DAs is negligible.

Thus, hereinafter, a method for determining uplink transmission power by reflecting a different in reception power between respective DAs and noise and interference in a DMNS in Equation 2 for determining uplink transmission power in a CAS is provided.

Estimation of Propagation Loss (L) Value

First, a method for effectively estimating a propagation loss in a mobile station by using a downlink channel in a DMNS will be described. Namely, a mobile station converts reception power measured from each antenna or DA into a value effective in the DMNS and utilizes the value for controlling power.

The mobile station may estimate power of a reference signal received from each DA or each antenna by using one of the following three methods.

1. Arithmetic mean power (simple power average)
(1) Antenna Level $$\tilde{L} = \frac{1}{N} \sum_{n=1}^{N} L_n \qquad \text{[Equation 6]}$$

where $\tilde{L}$: estimated average DL propagation loss
$L_n$: estimated DL propagation loss for n-th antenna
N: number of total physical antennas In Equation 6, $\tilde{L}$ is an estimated average DL propagation loss, $L_n$ is an estimated DL propagation loss with respect to nth antenna, and N is the number of entire physical antennas.

(2) DA Level $$\tilde{L} = \frac{1}{M} \sum_{n=1}^{M} L_n \qquad \text{[Equation 7]}$$

where $\tilde{L}$: estimated average DL propagation loss
$L_n$: estimated DL propagation loss for n-th DA
M: number of total DAs Here, $L_n$ may be an estimate average value with respect to antennas of a DA.

2. A truncated mean with respect to reception power equal to or higher than an effective reception power level
(1) Antenna level $$\tilde{L} = \frac{1}{P} \sum_{n=1}^{P} L_n \qquad \text{[Equation 8]}$$

where $\tilde{L}$: estimated average DL propagation loss
$L_n$: estimated DL propagation loss for n-th antenna ($L_n \geq C$, C: effective Received Power threshold)
P: number of total effective physical antennas When a maximum number of effective antennas is fixed to K, P is determined to be smaller value (P') than K.

Namely, P'=min(K, P), and P' is calculated as an average of P' number of higher $L_n$.

(2) DA Level $$\tilde{L} = \frac{1}{M} \sum_{n=1}^{M} L_n \qquad \text{[Equation 9]}$$

where $\tilde{L}$: estimated average DL propagation loss
$L_n$: estimated DL propagation loss for n-th DA ($L_n \geq C$, C: effective Received Power threshold)
M: number of total effective DAs Here, M' may be an estimated average value with respect to antennas of a DA. Also, when the maximum number of effective DAs is fixed to K, M is determined to be a value M' smaller than K. Namely, when M'=min(K,M), $\tilde{L}$ is calculated as an average of M' number of higher $L_n$.

$$\tilde{L} = \frac{1}{M} \sum_{m=1}^{M} L'_m, \; L'_m = \left( \frac{1}{P_m} \sum_{n=1}^{P_m} L_n \right) \qquad \text{[Equation 10]}$$

where $\tilde{L}$: estimated average DL propagation loss
$L'_m$: estimated DL propagation loss of the effective m-th DA
$L_n$: estimated DL propagation loss for n-th antenna of the m-th DA ($L_n \geq C$, C: effective Received Power threshold)
$P_m$: number of effective antennas in m-th DA
M: number of total effective DAs If the maximum number of effective antennas is fixed to K, M is determined to be a value (M') smaller than K. Namely, M'=min(K, M), and $\tilde{L}$ is calculated as an average of $L'_m$ number of higher $L'_m$.

3. Weighted power average with respect to effective DA or antenna (1) Antenna Level A differential weight is applied with reference to a power distribution with respect to $L_n$ estimated from each antenna, and an average thereof is calculated.

$$\tilde{L} = \frac{1}{P} \sum_{n=1}^{P} \alpha_n L_n \qquad \text{[Equation 11]}$$

where $\tilde{L}$: estimated average DL propagation loss
$\alpha_n$: weight factor to compensate DL propagation loss $L_n$
$L_n$: estimated DL propagation loss for n-th antenna ($L_n \geq C$, C: effective Received Power threshold)
P: number of total effective physical antennas If a maximum number of effective antennas is fixed to K, P is determined to be a value (P') smaller than K.

Namely, P'=min(K, P), and $\tilde{L}$ is calculated as a weighted average of P' number of higher $L_n$.

(2) DA Level

A differential weight is applied with reference to power distribution with respect to $L_n$ estimated from each DA and an average thereof is calculated.

$$\tilde{L} = \frac{1}{M} \sum_{n=1}^{M} \alpha_n L_n \qquad \text{[Equation 12]}$$

where $\tilde{L}$: estimated average DL propagation loss
$\alpha_n$: weight factor to compensate DL propagation loss $L_n$
$L_n$: estimated DL propagation loss for n-th DA ($L_n \geq C$, C: effective Received Power threshold)
M: number of total effective DAs Here, M' may be an average estimate value with respect to antennas in the DA. Also, when a maximum number of effective DAs is fixed to K, M is determined to be a value (M') smaller than K. Namely, M'=min(K, M), and, $\tilde{L}$ is calculated as an average of M' number of $L_n$.

Method for Estimating Noise and Interference Level (NI)

In general, an NI value may be obtained by averaging mobile stations other than a value of a corresponding mobile station with respect to an uplink control channel or data channel. The NI value, as a large scale parameter, greatly affects uplink power control of a mobile station, like a propagation loss. In the case of CAS, in general, an NI value is measured as a value with respect to a cell. Namely, NI values received by mobile stations located in a particular cell are the same or similar. However, in the case of a DAS, since DAs are disposed in a distributed manner, NI values received by respective DAs may be different.

Thus, the BS may consider the following two cases.

1. The BS informs DAs (effective DAs) receiving data of a corresponding mobile station about a single NI value (Single NI).

2. The BS informs DAs (effective DAs) receiving data of a corresponding mobile station about multiple NI values (Multiple NI).

Namely, one method is a method for effectively estimating NI by using an uplink channel in a base station, and the other method is a method for effectively estimating NI by a mobile station by using NI substantially estimated by a base station.

In case of using the first method, the BS may estimate NI by measuring an uplink channel received by each antenna or DA. In this case, the BS may estimate average NI with respect to a corresponding mobile station by using 1) a method for obtaining average NI, similar to the method for estimating downlink reception power in a mobile station as described above, 2) a method for obtaining an average with respect to an effective reception NI, and 3) a method for obtaining a weighted average with respect to effective reception NI.

Namely, in Equation 6 to Equation 12, the average NI with respect to the corresponding mobile station may be estimated by applying $NI_n$, instead of $NI_n$.

Here, $NI_n$ includes large-scale channel quality as reception power of an uplink channel of each antenna or each DA estimated by the base station, and may further include even small-scale channel quality. In addition, when a mobile station transmits multiple streams, an NI value is an average of reception power of each transport stream. Namely, an NI value may be estimated in the same manner as that of estimating the L value. The application of the first method is advantageous in that an amount of information regarding NI included in a downlink control channel transmitted to a mobile station is a single value with respect to the mobile station, which is the same as that of an existing case.

Also, in case of using the second method, the BS may estimate NI of each antenna by measuring an uplink channel received by each antenna of the entire DAs or an effective DA.

Here, the BS informs the mobile station about an average value with respect to the NI estimated for each antenna of the corresponding DAs. In this case, an average can be obtained by limiting to all the antennas or effective antennas of the corresponding DAs. In this case, the NI information of each DA transmitted by the BS may be one of the following information.

i) NI values of corresponding DAs
ii) Average NI Value of corresponding DAs+differential value
iii) Max. NI Value of corresponding DAs+differential value
iv) Min. NI Value of corresponding DAs+differential value Namely, the BS may transmit each NI value of corresponding DAs, or a difference between an average value and each NI value. The mobile station receives the NI value with respect to each DA and re-estimates it in a manner similar to Equations 7, 9 or 12.

In comparison to the first method, the second method is disadvantageous in that it has great control channel transmission overhead and increases calculation complexity of the mobile station, but advantageous in that the mobile station can actively control power to thus enhance performance.

To sum up, in the DMNS, Equation 2 is corrected as shown in Equation 13 below.

$$P(\text{dBm}) = \tilde{L} + \text{SIN } R_{Target} + \tilde{NI} + \text{Offset} \quad \text{[Equation 13]}$$

Here, $\tilde{L}$ and $\tilde{NI}$ in Equation 13 may be one of the values obtained by the method proposed in the second embodiment.

Also, when an effective antenna or DA is determined and there is not need to change it, a comparison with the effective reception power level (or effective received power threshold) may not be applied. Also, in the case of initial imaging, an effective reception power level cannot be known, so comparison is not performed.

Third Embodiment

The third embodiment of the present disclosure provides a method of re-estimating a representative path loss with respect to the entire serving nodes by assigning weight to a downlink path loss estimated for each node.

Estimation of representative path loss through application of weight

It is assumed that when M number of nodes are uplink serving nodes with respect to a mobile station, a path loss of each node estimated by the mobile station is $P(n)(n=1, \ldots, M)$.

The mobile station re-estimates a representative path loss P with respect to the entire serving nodes by assigning a weight $P(n)(n=1, \ldots, M)$ to an estimated path loss (or an estimated propagation loss) for each node $$P = 10\log 10 \left( \sum_{n=1}^{M} w(n) \cdot 10^{\wedge}\left(\frac{P(n)}{10}\right) \right)_{[dBm]} \quad \text{[Equation 14]}$$

Here, the weight w(n) may be determined by using at least any one of the following methods.

Method 1: Method of estimating, by a BS, a path loss based on an uplink reception power distribution of each node, and signaling it to a mobile station The BS determines a weight $w(n)(n=1, \ldots, M)$ (with respect to each node based on a difference in uplink reception power in each node with respect to a reference node.

a) A node having reception power equal to or the closest to a mean with respect toi reception power of uplink service nodes b) A node having reception power equal to or the closest to a median with respect toi reception power of uplink service nodes c) A node having minimum reception power among uplink serving nodes.

d) A node having maximum reception power among uplink serving nodes.

Figure 6:
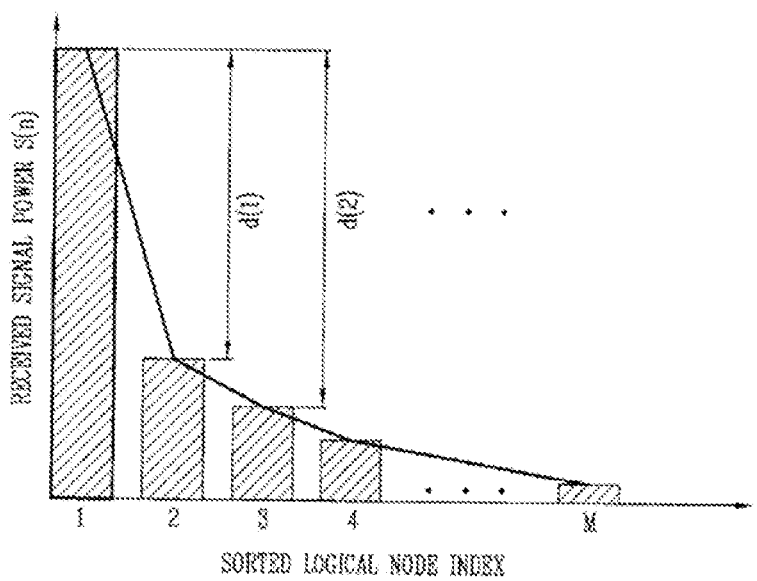
FIG. 6 is a graph showing the results of pathloss in respective nodes aligned in descending order according to a third embodiment of the present invention.

FIG. 6 is a graph showing the results of path loss in respective nodes aligned in descending order.

In order to determine a weight based on uplink reception power difference in each node with respect to a reference node, a following method is used.

1. The BS selects a weight by comparing a reception power difference or ratio in each node with respect to the reference node, and signals weight information of each node to the mobile station.

Namely, when a difference or ratio between reception power of the reference node and each node is $d(n)(n=1, \ldots, M)$, if $d(n)(n=1, \ldots, M)$ belongs to the same range, a corresponding node applies the same weight.

In another embodiment, the BS may signal information regarding a node group and weight with respect to each group to the mobile station, or the BS may signal information regarding a node group and range information regarding each group to the mobile station.

Also, the BS may signal all the information regarding the range and the weight to the mobile station to allow the mobile station to re-estimate a representative path loss by applying the corresponding range and weight to a downlink path loss distribution with respect to serving nodes.

Table 1 below shows examples of applying weight to ranges of nodes or node groups.

X is a difference or ratio with uplink reception power of each node or uplink reception power of a reference node.

TABLE 1

| Index | Range (dB) | Weight |
|---|---|---|
| 1 | X < 5 | 0.30 |
| 2 | 5 < X < 10 | 0.25 |
| 3 | 10 < X < 15 | 0.15 |
| 4 | 15 < X < 20 | 0.1 |
| 5 | 20 < x < 25 | 0.05 |
| 6 | 25 < X < 30 | 0.03 |
| 7 | 30 < X < 35 | 0.02 |
| 8 | More than 35 dB | Sum of weight for other nodes = 0.1 |

A weight used to obtain a representative path loss is compensated for such that a total sum thereof is 1.

A weight with respect to a reference node may be obtained according to a reference node characteristics as follows.

(1) When a reference node corresponds to an item a) or b), a weight of each section is applied based on a difference in minimum or maximum of uplink reception power.

(2) When a reference node corresponds to an item c) or d), a weight of each section is applied based on a difference in mean or median of uplink reception power.

Figure 7:
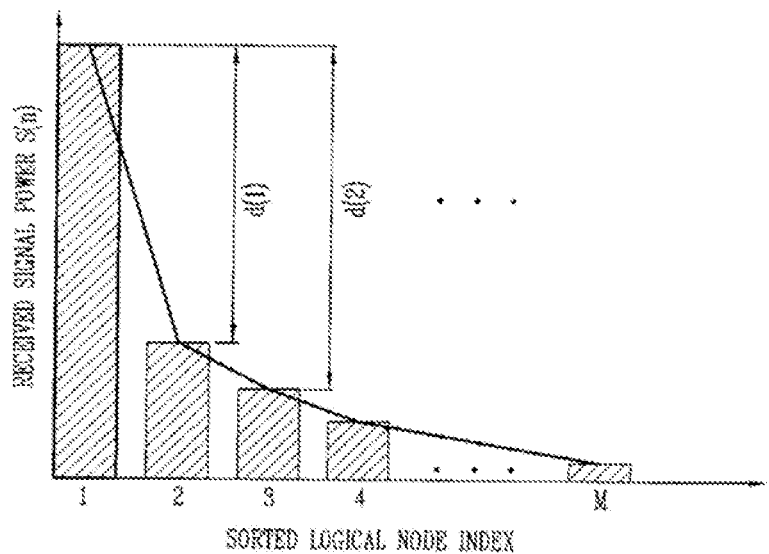
FIGS. 7 and 8 are graphs showing examples when a reference node is a node having the best uplink reception power and when the reference node is a node having a average value according to the third embodiment of the present invention.
Figure 8:
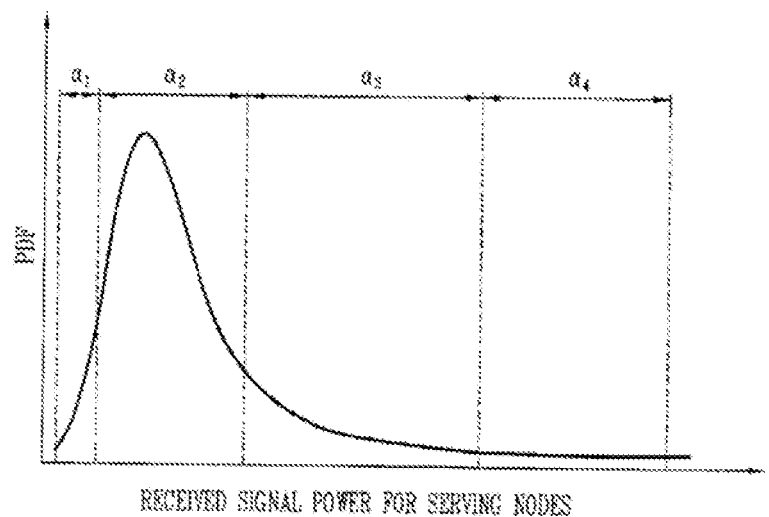

FIGS. 7 and 8 are graphs showing examples when a reference node is a node having the best uplink reception power and when the reference node is a node having a average value according to the third embodiment of the present invention.

2. Weights are assigned such that a particular weight is assigned to each node with respect to an upper X % with respect to a descending order alignment value with respect to uplink reception power in serving nodes, and a residual weight is assigned to the other remaining nodes.

Here, as for the weight with respect to higher nodes, preferably a more weight is assigned to lower nodes in order to reduce an error according to a reception power deviation in each node. A weight of each node may be set to be different according to the number of serving nodes. Or, it may be re-calculated by using weight values with respect to a particular maximum node number.

Table 2 and Table 3 are example of applying weights in each node.

TABLE 2

| Node Index | Weight |
|---|---|
| 1 | 0.05 |
| 2 | 0.05 |
| 3 | 0.05 |
| 4 | 0.1 |
| 5 | 0.1 |
| 6 | 0.15 |
| 7 | 0.2 |
| 8 (others) | 0.3 |

TABLE 3

| Node Index | Weight |
|---|---|
| 1 | 0.05 |
| 2 | 0.1 |
| 3 | 0.15 |
| 4 (others) | 0.8 |

3. Weights may be assigned such that a particular weight is assigned to each node with respect to lower X % with respect to descending alignment values with respect to uplink reception power with respect to serving nodes, and residual weight is distributed to the other remaining nodes.

4. As for w(n), distribution of reception power values of each serving node measured in the BS is divided into L number of sections and different weights are applied to each section. Here, a weight w'(l)(l=1, ..., L) with respect to each section is differentially divided according to distribution of reception power in each node.

Figure 9:
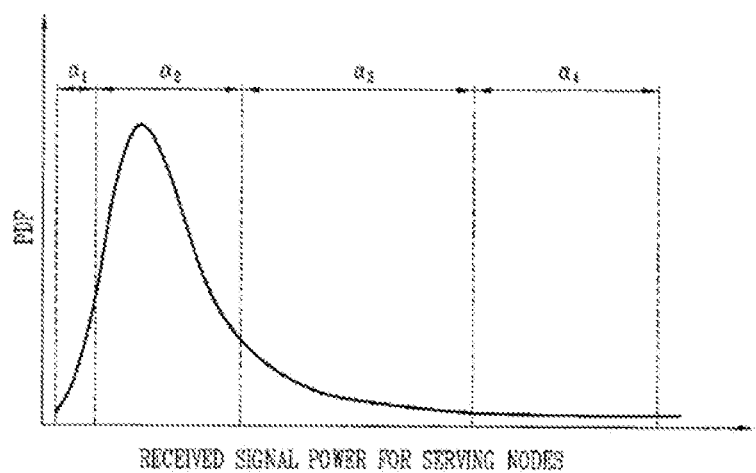
FIG. 9 is a graph showing that reception power distribution in serving nodes are divided into four sections and different weights are applied thereto according to the third embodiment of the present invention.

FIG. 9 is a graph showing that reception power distribution in serving nodes are divided into four sections and different weights are applied thereto according to the third embodiment of the present invention.

As illustrated in FIG. 9, the BS may divide reception power distribution in serving nodes into four sections and apply different weights $\alpha_2$, $\alpha_2$, $\alpha_4$, $\alpha_4$ to the sections.

Method 2: the BS defines weight with respect to the number of service nodes with respect to each mobile station and signals the same to each mobile station The BS has a generalized weight value with respect to reception power distribution among mobile stations and nodes according to the number of serving nodes and transmits the value UE-specifically according to the number of serving nodes with respect to each mobile station. Namely, in the case of the method 1, a weight is calculated with respect to each mobile station, but in method 2, the BS has a common weight value with respect to the number of serving nodes with respect to mobile stations, and signals them according to the number of serving nodes of each mobile station.

In another example, the BS has a table with respect to a generalized weight value, and signals it UE-commonly. A mobile station receives it and applies it with respect to the number of serving nodes thereof.

Method 3: Mobile station may re-estimate a representative path loss with respect to a path loss by using a reception power range and/or weight with respect to predefined serving nodes.

Method 4: A weight is calculated by using a predefined weight generation rule

The weight generation rule in method 4 may be configured in the form of a function with respect to a path loss in each serving node.

Namely, a weight with respect to each serving node generated by a mobile station is shown in Equation 15 below.

$$w(n)=f(P(1), \ldots, P(N)) \text{ for } n=1, \ldots, M \quad \text{[Equation 15]}$$

For example, the mobile station generates a weight satisfying a particular value $\alpha$ which is previously defined or signaled from the BS. Namely, the mobile station generates w(n) satisfying w(n)P(n)=$\alpha$, where n=1, ... M ($\alpha$target path-loss), and applies it to calculation of a representative downlink path loss.

In another example, the mobile station generates a weight with respect to each serving node by applying a previously determined weight generation rule to a parameter with respect to a distribution function of a path loss previously determined or signaled from the BS.

For example, it is assumed that a path loss distribution P with respect to serving nodes has a normal distribution as shown in Equation 16 below.

$$f(x) = \exp\left\{\frac{-(x-m)^2}{2\sigma^2}\right\} \frac{1}{\sqrt{2\pi\sigma^2}},  \quad \text{[Equation 16]}$$

where m: mean value, σ: standard deviation

The mobile station sets a reference distribution by using a parameter of m, i.e., m and σ² (or σ²), received from the BS or known, and generates a weight that can minimize a difference with respect to a path loss distribution of serving nodes measured over a reference distribution, and applies it.

In the third embodiment, instead of using the reference node, a reference value may be used. Namely, the BS may determine a weight w(n)(n=1, . . . , M) with respect to each node based on a difference in uplink reception power in each node with respect to a reference value. Here, the reference value may be determined by using one of the following methods.

a) An average value of reception power of uplink serving nodes b) A median value of reception power of uplink serving nodes c) A minimum value of reception power of uplink serving nodes d) A maximum value of reception power of uplink serving nodes In the above, the weight value w(n), a linear value, has a value between 0 and 1.

Also, the method of the third embodiment may be applicable to both of an IEEE 802.16 system and an LTE-A system as mentioned above.

Also, the uplink reception power in the third embodiment may be replaced by an uplink path loss, a downlink path loss, downlink reception power, and the like. Here, reception power and path loss have a reciprocal relationship, so they should be applied by reflecting it. Also, the uplink path loss (or uplink reception power) requires compensation by a constant coefficient with respect to a downlink path loss (or downlink reception power).

Fourth Embodiment

In a fourth embodiment of the present disclosure provides a method for effectively obtaining uplink transmission power with respect to an initial ranging channel or a data channel when a mobile station and a BS can discriminate each node in a DMNS, and a method for transmitting a parameter thereof.

In detail, a method of transferring an EIRP or an RSS with respect to each node included in a BS to the mobile station, and effectively obtaining an initial ranging channel therethrough is provided.

Also, in obtaining uplink transmission power with respect to a data channel, a method for effectively estimating a path loss, shading L, and downlink SIR with respect to a node occupied by the terminal and a method of estimating an NI with respect to nodes occupied by a mobile station by a BS are provided.

Determination of Transmission Power with Respect to Initial Ranging Channel

Hereinafter, a method for determining transmission power with respect to initial ranging channel in a DMNN system.

First, Equation 17 and equation 18 are formulas for determining transmission power with respect to initial ranging channel applied to a CAS (e.g., an IEEE 802.16 system).

$$P_{TX\_IR\_MIN} = EIRxP_{IR,min} + BS\_EIRP - RSS \quad \text{[Equation 17]}$$

In Equation 17, $EIRxP_{IR,min}$ is a minimum target reception power, BS_EIRP is transmission power of the BS, and RSS is a received signal strength measured by the mobile station.

When transmission and reception antenna gains of the mobile station are different, Equation 18 shown below is applied.

$$P_{TX\_IR\_MIN} = EIRxP_{IR,min} + BR\_EIRP - RSS + (G_{Rx\_MS} - G_{TX\_MS}) \quad \text{[Equation 18]}$$

Here, $G_{RX\_MS}$ is a reception antenna gain of the mobile station, and $G_{TX\_MS}$ is a transmission antenna gain of the mobile station.

In case of a DAS, multiple nodes may exist and transmission power of each node may be different, so the BS EIRP transmitted by the BS may be required to be a value with respect to each node included in the BS. Thus, in the DAS, the mobile station should determine transmission power with respect to initial ranging channel based on the EIRP of each node. Here, in applying a method for obtaining transmission power with respect to an existing initial ranging channel, the transmission power should be converted into at least one of the following forms so as to be used.

Namely, the mobile station may use 1) a median value, 2) an average value, 3) a weighted average value, 4) the highest EIRP, or 5) the lowest EIRP.

The nodes may be all the nodes of the BS, or may be nodes satisfying certain conditions of the MS (e.g., nodes having reception strength exceeding a threshold value in downlink).

In the case of an IEEE 802. 16M system, an EIRP transmitted by the BS is a value having 6 bits with respect to a range from 1 dBm to 64 dBm, which is transmitted to an S-SFH SP1.

Thus, in an embodiment, the BS may broadcast EIRP values of all the nodes included in the BS to the mobile station.

In still another embodiment, a value with respect to a reference node may be transmitted, and an EIRP with respect to different nodes may be transmitted as a differential value with respect to an EIRP of the reference node.

If a space of the existing SFH (Super Frame Header) is insufficient, control information including an EIRP of each node may be transmitted through size extension.

Namely, when a network entry cell of the mobile station is a DMNS, an extended indicator is activated in the SFH and corresponding information may be transmitted through the extended SFH.

In addition, an RSS should be received signal strength with respect to each node included in the BS. The mobile station may determine transmission power with respect to initial ranging channel by using the RSS with respect to the reference signal received from each node.

Namely, in applying a method for obtaining transmission power with respect to an existing initial ranging channel, RSS should be converted into at least one of the following forms so as to be used.

Namely, the mobile station may use 1) a median value, 2) an average value, 3), a weighted average value, 4), the highest RSS, or 5) the lowest RSS with respect to an RSS of each node.

The node is the same as that used for calculating EIRP.

Determination of Transmission Power with Respect to Data Channel

In the case of the existing CAS, L in Equation 2 includes a path loss and a shade loss with respect to a transmission from one base station, i.e., one node, to a mobile station. In case that the BS includes a plurality of nodes as in the DMNS, if it is impossible to discriminate L with respect to a node, the mobile station measures L with respect to an RF combined signal of a reference signal transmitted from each node, and this may fail to reflect the characteristics of each node to cause a degradation of performance.

Thus, each mobile station is required to be able to discriminate a reference signal with respect to each node. Thus, in the case of the DAS, L of each node measured by the mobile station should be converted into at least one of the following forms so as to be used, in applying an existing method for obtaining uplink transmission power.

Namely, with respect to L with respect to nodes occupied by the mobile station, 1) a median value, 2) an arithmetic average value, 3) a weighted average value, 4) the highest value, 5) the lowest value, or 6) L with respect to a reference node among nodes occupied by the mobile station In the above, a node occupied by the mobile station may be an uplink node allocated by the BS or a node satisfying certain conditions of the mobile station (e.g., all the nodes of the BS, a portion or the entirety of downlink nodes allocated by the BS, or a node having received strength in downlink exceeding a threshold value). Here, that the node occupied by the mobile station is an uplink node allocated by the BS or a node satisfying certain conditions is not limited to the fourth embodiment but applied to all the embodiments proposed in the present disclosure.

In another embodiment, a node occupied by the mobile station may be statically/semi-statically/dynamically changed according to a scheduling method, so L estimated by using at least one of the aforementioned methods with respect to combinations of all the nodes which are included in the BS to which the mobile station belongs and which may be occupied by the mobile station may be used to select a node and/or determine initial uplink data transmission power with respect to selected nodes.

Also, in Equation 2 and Equation 3, $SIR_{DL}$ should also be extended with respect to each node included in the mobile station, and like L, the methods 1) to 6) is applied in applying the existing method for obtaining uplink transmission power. Namely, L in the methods 1) to 6) may be replaced by $SIR_{DL}$.

As mentioned above, in order to maximize performance in the DAS, nodes are required to be discriminated in the mobile station and the BS. Thus, in the existing CAS, each BS measures a single NI value with respect to each mobile station and transmits the measured NI value to the mobile station, but in the case of DMNS, a BS should measure an interference and noise level (NI) value with respect to nodes occupied by each mobile station and transmit the same to each mobile station. Here, the NI should be converted into at least one of the following forms so as to be used. Thus, in applying the existing method for obtaining uplink transmission power, the methods 1) to 6) are applied to the NI. Namely, L in the methods 1) to 6) may be replaced by NI.

In another embodiment, the BS transmits the NIs measured with respect to each node to the mobile station, and the mobile station estimates an NI by using at least one of the aforementioned methods.

The aforementioned reference node may be at least one of a node having the greatest RSS, a node having the greatest geometry with respect to each node, and a node closest to a BS.

Fifth Embodiment

A fifth embodiment of the present disclosure provides a power control method using an uplink channel.

Here, the fifth embodiment may be applied to the existing CAS as well as to the DMNS.

Equation 2 calculates uplink transmission power basically based on downlink reception power. However, downlink and uplink channels are not identical and may have a significant difference. Thus, a method for controlling transmission power by using one of the following two methods will be described.

Method 1: Power control based on downlink reception power and a difference between uplink and downlink Method 1 may be applied to an existing uplink power control method without a great alteration.

First, downlink reception power may be obtained by utilizing an existing scheme to the maximum level.

A mobile station obtains downlink reception power with respect to a BS transmission antenna by using a reference signal (e.g., preamble/midamble/CRS/CSI-RS etc.). Here, the BS transmission antenna may be the actual entire physical antennas or a valid antenna with respect to a particular threshold value. Also, in the case of DMNS, the BS transmission antenna may include the entire DAs or an effective DA with respect to a particular threshold value.

When a mobile station transmits information regarding downlink reception power, the BS obtains a reception power difference $Offset_{DL\_btw\_UL}$ between uplink and downlink by comparing it with uplink reception power with respect to the mobile station. The BS transmits information regarding the difference along with information regarding an NI level to the mobile station. In this case, the information may be transmitted in one of the following three forms.

(1) The information is transmitted in the form of NI'=NI+$Offset_{DL\_btw\_UL}$ with respect to an existing NI level.

(2) The information is transmitted in the form of Offset'=Offset+$Offset_{DL\_btw\_UL}$ with respect to an existing Offset.

(3) $Offset_{DL\_btw\_DL}$| is transmitted apart from NI.

Equation 19 to Equation 21 are equations when the (1) to (3) methods are applied to Equation 2.

In Equation 19 to Equation 21, $\tilde{L}_{DL}$ is downlink reception power, which indicates an average estimate value with respect to a BS (effective) transmission antenna or DA. Also, $\tilde{NI}$ may be a function with respect to an estimate value with respect to each (effective) antenna or DA, rather than a single value.

$\tilde{NI}$ may be a BS average estimate value with respect to NI. Here, $\tilde{NI}$ may be an average estimate value of NI with respect to each reception anteenan or DA of the BS or an estimate average of NI values with respect to each effective reception antenna or effective DA. $\tilde{NI}$ may be an average of the entire reception (effective) antennas or DAs, and may be an estimate value with respect to each (effective) antenna or DA. When $\tilde{NI}$ is a value with respect to DA, the corresponding value appears as an average estimate value with respect to antennas of the corresponding DA.

First, Equation 19 shows a case in which the method (1) is applied to Equation 2.

$$P(dBm) = \tilde{L}_{DL} + SIN R_{Target} + \tilde{NI}' + Offset \quad \text{[Equation 19]}$$

Equation 19 shows a method of adding a difference between uplink and downlink reception power and transmitting the same with respect to an NI level transmitted from the BS. Here, $\tilde{NI}'$ is a value obtained by adding the difference between the uplink and downlink reception power $Offset_{DL\_btw\_UL}$ to $\tilde{NI}$. Here, $Offset_{DL}$ btw_UL may be an average of the entire (effective) antennas or Das or may be a value with respect to respective (effective) antenna or DA. When the $Offset_{DL\_btw\_UL}$ is a value with respect to a DA, the corresponding value appears as an estimate average with respect to antennas within the corresponding DA. When a BS transmission antenna and reception antenna are different, $Offset_{DL\_btw\_UL}$ may be expressed as a difference between uplink average reception power and downlink average reception power. $\tilde{L}_{DL}$, $SINR_{Target}$, $\tilde{NI}$, Offset, etc., are the same as described above.

Equation 20 shown below is an equation when the method (2) is applied to Equation 2.

$$P(dBm)=\tilde{L}_{DL}+SIN R_{Target}+\tilde{NI}+\text{Offset'} \qquad \text{[Equation 20]}$$

Equation 20 is a method of adding a reception power difference between uplink and downlink to a power control adjustment value of a BS or a mobile station and transmitting the same. Here, Offset' is a value obtained by adding a difference in reception power between uplink and downlink to Offset. Here, $\text{Offset}_{DL\_btw\_UL}$ may be an average of the entire (effective) antennas or Das or may be a value with respect to respective (effective) antenna or DA. When the $\text{Offset}_{DL\_btw\_UL}$ is a value with respect to a DA, the corresponding value appears as an estimate average with respect to antennas within the corresponding DA. When a BS transmission antenna and reception antenna are different, $\text{Offset}_{DL\_btw\_UL}$ may be expressed as a difference between uplink average reception power and downlink average reception power. $\tilde{L}_{DL}$, $SINR_{Target}$, $\tilde{NI}$, Offset etc., are the same as described above.

Equation 21 shown below is an equation when the method (3) is applied to Equation 2.

$$P(dBm)=\tilde{L}_{DL}+SIN R_{Target}+\tilde{NI}+\text{Offset}+\text{Offset}_{DL\_btw\_UL} \qquad \text{[Equation 21]}$$

Equation 21 shows a method of transmitting a difference between uplink and downlink reception power as a separate format by a BS and determining transmission power by a mobile station with reference thereto. Here, $\text{Offset}_{DL\_btw\_UL}$ may be an average of the entire (effective) antennas or Das or may be a value with respect to respective (effective) antenna or DA. When the $\text{Offset}_{DL\_btw\_UL}$ is a value with respect to a DA, the corresponding value appears as an estimate average with respect to antennas within the corresponding DA. When a BS transmission antenna and reception antenna are different, $\text{Offset}_{DL\_btw\_UL}$ may be expressed as a difference between uplink average reception power and downlink average reception power. $\tilde{L}_{DL}$, $SINR_{Target}$, $\tilde{NI}$, Offset etc., are the same as described above.

Method 2: Power control based on uplink reception power

Method 2 is a method of directly using uplink reception power unlike the existing downlink reception power-based power control.

Uplink reception power may be measured by a BS by using an uplink reference signal with respect to a mobile station such as a sounding channel or a sounding reference signal (SRS). In this case, the mobile station should information the BS about a boosting level with respect to a sounding channel. Besides, the BS may measure by using various uplink control signals such as bandwidth request signal, an uplink feedback signal, or the like, or a data signal, etc. Here, the mobile station may need to information the BS about transmission power (transmission power or an available power amount) of an initial transmission signal. The BS may transmit reception power with respect to a corresponding (effective) reception antenna or DA to the mobile station or an average estimate value with respect to corresponding (effective) reception antenna or DA to the mobile station.

The mobile station may calculate transmission power as expressed by Equation 22 shown below based on the corresponding information.

$$P(dBm)=\tilde{L}_{UL}+SIN R_{Target}+\tilde{NI}+\text{Offset} \qquad \text{[Equation 22]}$$

Here, uplink reception power $\tilde{L}_{UL}$ estimated by the BS may be obtained by using the three types of methods (Equation 6 to Equation 12) applied to the second embodiment. Namely, the uplink reception power can be obtained by discriminating an antenna level and a DA level by using 1) an arithmetic average with respect to reception npower, 2) an arithmetic average with respect to reception power equal to or greater than an effective reception power level, and 3) a weighted power average with respect to an effective DA or antenna.

Also, a representative path loss estimation calculation method through application of a weight to each node employed in the third embodiment may be used.

In the method 2, when an effective reception antenna or DA has been determined or is not required to be changed, it does not required to be compared with an effective reception antenna power level (or effective received power threshold) in calculating $\tilde{L}$. Here, the effective reception antenna power level indicates a reference threshold value for determining an effective antenna or DA with respect to an uplink reception antenna or DA.

In a different form of directly using uplink reception power, the BS may add the estimated uplink reception power and NI and inform the mobile station accordingly.

Here, the corresponding value may be a value with respect to each effective antenna, an average estimate value with respect to the entire effective antennas, a value with respect to each effective DA, or an average estimate value with respect to each effective DA.

Equation 23 shown below is an equation for determining uplink transmission power when the BS adds the estimated uplink reception power and NI and informs the mobile station about the same.

$$P(dBm)=\tilde{L}_{UL}'+SIN R_{Target}+\text{Offset} \qquad \text{[Equation 23]}$$

In Equation 23, $\tilde{L}_{UL}'$ is $\tilde{L}_{UL}+\tilde{NI}$. Here, $\tilde{NI}$ can be obtained according to the method as described in the method 1. $\tilde{NI}$ is a BS average estimate value with respect to NI. Here, $\tilde{NI}$ may be an average estimate value of NI value with respect to each BS reception antenna or DA or an estimate average of NI values with respect to respective effective reception antennas or effective Das. $\tilde{NI}$ may be an average with respect to the entire reception (effective) antennas or Das, or may be an estimate value with respect to respective (effective) antennas or Das. When $\tilde{NI}$ is a value with respect to a DA, the corresponding value appears as an estimate average value with respect to antennas within the corresponding DA. Thus, $\tilde{L}_{UL}'$ may appear in the form of a single value with respect to the entire effective antennas or a value with respect to each DA according to the form of $\tilde{L}_{UL}$ and $\tilde{NI}$.

In the case of the method 2, calculation complexity of a mobile station is relatively low but the method cannot be used when control information transmission from a BS such as initial ranging, or the like, is impossible.

Figure 10:
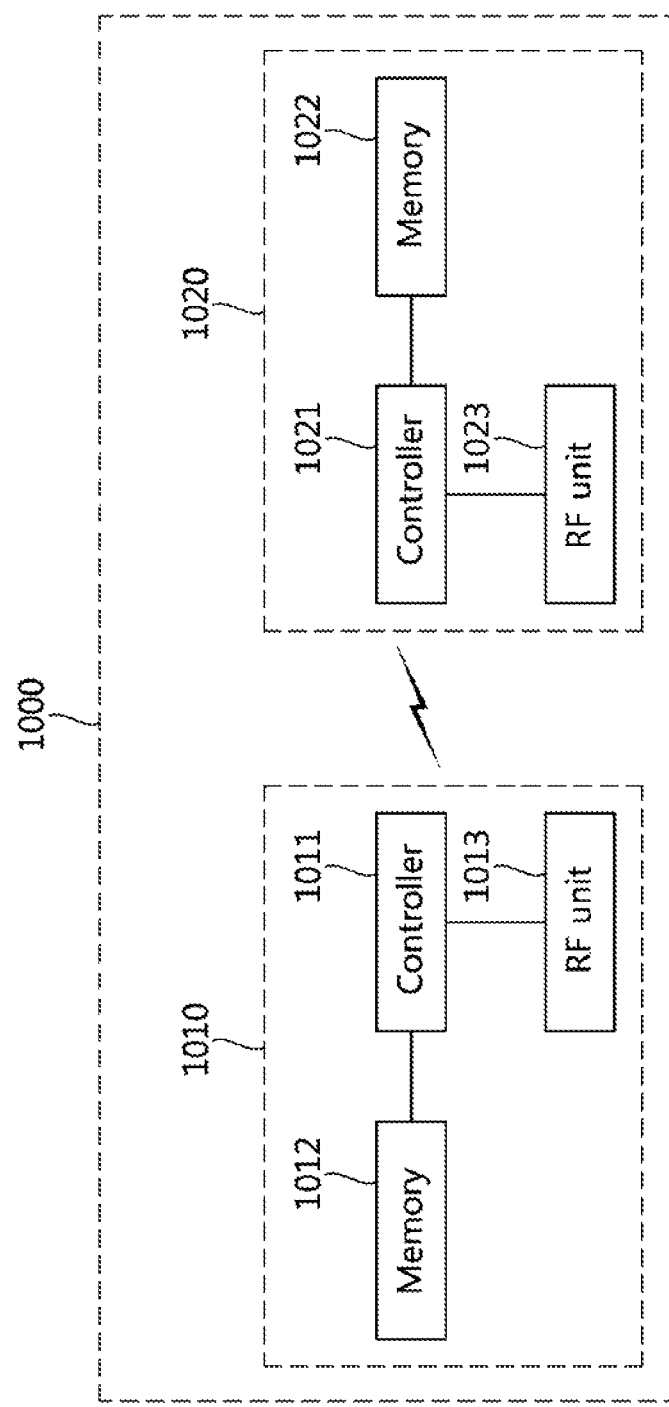
FIG. 10 is a schematic block diagram of a wireless communication system according to an embodiment of the present invention.

FIG. 10 is a schematic block diagram of a wireless communication system according to an embodiment of the present invention.

A base station (BS) 1010 includes a controller 1011, a memory 1012, and a radio frequency (RF) unit 1013.

The controller 1011 implements a proposed function, process, and/or method. Layers of a radio interface protocol may be implemented by the controller 1011.

The controller 1011 may provide control to transmit information regarding estimated noise and interference information used for calculating uplink transmission power of a mobile station to the mobile station through noise and interference received from a plurality of antenna nodes including at least one antenna.

The memory 1012 is connected to the controller 1011 and stores a protocol or a parameter for operating a DM NS. The RF unit 1013 is connected to the controller 1011 and transmits and/or receives a radio signal.

A mobile station 1020 includes a controller 1021, a memory 1022, and an RF unit 1023.

The controller 1021 implements a proposed function, process, and/or method. Layers of a radio interface protocol may be implemented by the controller 1021.

The controller 1021 may provide control to determine uplink transmission power through reception power of reference signals received from a plurality of antenna nodes including at least one antenna.

The memory 1022 is connected to the controller 1021 and stores a protocol or a parameter for operating a DMNS. The RF unit 1023 is connected to the controller 1021 and transmits and/or receives a radio signal.

The controllers 1011 and 1021 may include an ASIC (Application-Specific Integrated Circuit), a chip-set, a logical circuit and/or a data processor. The memories 1012 and 1022 may include a ROM (Read-Only Memory), a RAM (Random Access Memory), a flash memory, a memory card, a storage medium, and/or any other storage devices. The RF units 1013 and 1023 may include a baseband circuit for processing a radio signal. When the embodiments are implemented by software, the foregoing techniques may be implemented by modules (processes, functions, or the like) performing the foregoing functions. The modules may be stored in the memories 1012 and 1022 and executed by the controllers 1011 and 1021. The memories 1012 and 1022 may be provided within or outside the controllers 1011 and 1021, respectively, or may be connected to the processor 1410 and the processor 1470 controllers 1011 and 1021 through a well-known unit, respectively.

The invention claimed is:

1. A method for controlling uplink power by a terminal in a distributed multi-node system (DMNS), the method comprising:
   receiving equivalent isotropically radiated power (EIRP) information from a base station (BS) including a plurality of antenna nodes, each of the plurality of antenna nodes including at least one antenna;
   receiving reference signals from the plurality of antenna nodes;
   measuring received signal strength (RSS) of the reference signals;
   estimating an average propagation loss based on reception power of the reference signals;
   receiving noise and interference (NI) information from the BS via a downlink control channel;
   determining transmission power with respect to an initial ranging channel by using the received EIRP information and the measured RSS of the reference signals; and
   determining uplink transmission power with respect to an uplink data channel based on the estimated average propagation loss and the received NI information,
   wherein the EIRP information is broadcasted through a superframe header (SFH) and comprises power values for each of the plurality of antenna nodes and the EIRP information, the SFH including an extended indicator, and
   wherein, when the SFH is insufficient for broadcasting the EIRP information, the extended indicator is activated and the EIRP information is broadcasted through an extended SFH,
   wherein, in the estimating of the average propagation loss, the average propagation loss is estimated by using an arithmetic mean with respect to reception power of the reference signals corresponding to the plurality of respective antenna nodes, an arithmetic mean with respect to reception power greater than the effective reception power threshold value among reception power of the reference signals corresponding to the plurality of respective antenna nodes, or weighted average power with respect to the certain antenna nodes,
   wherein the weighted power average is calculated after a differential weight is applied to each of the plurality of antenna nodes with reference to reception power of corresponding reference signals, and
   wherein, after a reference antenna node among the plurality of antenna nodes is determined, the weight is determined by a ratio of uplink reception power of the respective antenna nodes to the reference antenna node.

2. The method of claim 1, further comprising:
   selecting certain antenna nodes from among the plurality of antenna nodes,
   wherein the selecting comprises:
      receiving an effective reception power threshold value with respect to the reception power of the reference signals from the BS; and
      comparing the effective reception power threshold value with the reception power of the received reference signals,
   wherein the certain antenna nodes are selected according to the comparison between the effective reception power threshold value with the reception power of the received reference signals.

3. The method of claim 1, wherein the NI information is a power level of NI corresponding to each of the plurality of antenna nodes.

4. The method of claim 3, wherein uplink transmission power is determined by using the arithmetic mean of NI information, the arithmetic mean of the power levels of NI greater than a threshold value included in the NI information, or a weighted NI power average with respect to a certain antenna node.

5. The method of claim 1, wherein the weight is previously determined for each antenna node or calculated according to a weight generation rule.

6. The method of claim 1, further comprising:
   receiving antenna control information indicating all the antenna nodes included in the BS or indexes or indicating the number of antenna nodes to be measured by a terminal, from the BS;
   determining target antenna nodes whose average propagation loss is to be estimated, based on the received antenna control information; and
   transmitting information regarding the determined target antenna nodes to the BS.

7. The method of claim 1, further comprising:
   receiving a target SINR indicating a minimum value of SINR requested by the BS,
   wherein the target SINR is determined through any one of a median value, an average value, the highest value and the lowest value among the ratios of noise to strength of downlink signals received from the plurality of antenna nodes.

8. The method of claim 1, further comprising:
   transmitting downlink reception power information measured from the plurality of antenna nodes to the BS; and
   receiving information regarding a difference between the transmitted downlink reception power and uplink reception power from the BS.

9. The method of claim 8, wherein the difference information is received together with the NI information or offset information indicating a power control adjustment value from the BS.

10. The method of claim 1, wherein the reference signals are received by antenna nodes or by antennas.

11. A terminal for controlling uplink power in a distributed multi-node system (DMNS), the terminal comprising:
a radio frequency (RF) unit configured to transmit and receive a radio signal; and
a controller operatively connected to the RF unit and configured to:
receive equivalent isotropically radiated power (EIRP) information from a base station (BS) including a plurality of antenna nodes, each of the plurality of antenna nodes including at least one antenna;
receive reference signals from the plurality of antenna nodes;
measure received signal strength (RSS) of the reference signals;
estimate an average propagation loss based on reception power of the reference signals;
receive noise and interference (NI) information from the BS via a downlink control channel;
determine transmission power with respect to an initial ranging channel by using the received EIRP information and the measured RSS of the reference signals; and
determine uplink transmission power with respect to an uplink data channel based on the estimated average propagation loss and the received NI information,
wherein the EIRP information is broadcasted through a superframe header (SFH) and comprises power values for each of the plurality of antenna nodes and the EIRP information, the SFH including an extended indicator,
wherein, when the SFH is insufficient for broadcasting the EIRP information, the extended indicator is activated and the EIRP information is broadcasted through an extended SFH,
wherein, in the estimating of the average propagation loss, the average propagation loss is estimated by using an arithmetic mean with respect to reception power of the reference signals corresponding to the plurality of respective antenna nodes, an arithmetic mean with respect to reception power greater than the effective reception power threshold value among reception power of the reference signals corresponding to the plurality of respective antenna nodes, or weighted average power with respect to the certain antenna nodes,
wherein the weighted power average is calculated after a differential weight is applied to each of the plurality of antenna nodes with reference to reception power of corresponding reference signals, and
wherein, after a reference antenna node among the plurality of antenna nodes is determined, the weight is determined by a ratio of uplink reception power of the respective antenna nodes to the reference antenna node.

12. The terminal of claim 11, wherein the controller
selects certain antenna nodes from among the plurality of antenna nodes,
controls the RF unit to receive an effective reception power threshold value with respect to reception power of the reference signals from the BS, and
compares the effective reception power threshold value with reception power of the received reference signals in order to select the certain antenna nodes according to the comparison between the effective reception power threshold value with the reception power of the received reference signals.

13. The terminal of claim 11, wherein the controller controls the RF unit to receive antenna control information indicating all the antenna nodes included in the BS or indicating the number of antenna nodes to be measured by a terminal, from the BS, and controls the RF unit to determine target antenna nodes whose average propagation loss is to be estimated, based on the received antenna control information and transmit information regarding the determined target antenna nodes to the BS.

14. The terminal of claim 11, wherein the controller controls the RF unit to receive a target SINR indicating a minimum value of an SINR requested by the BS, wherein the target SINR is determined through any one of a median value, an average value, the highest value and the lowest value among the ratios of noise to strength of downlink signals received from the plurality of antenna nodes.

15. The terminal of claim 11, wherein the controller controls the wireless communication unit to transmit information regarding downlink reception power measured from the plurality of antenna nodes to the BS, and controls the RF unit to receive information regarding a difference between the transmitted downlink reception power and uplink reception power from the BS.

16. The terminal of claim 15, wherein the difference information is received together with the NI information or offset information indicating a power control adjustment value from the BS.

* * * * *